US011269927B2

(12) United States Patent
Kakivaya et al.

(10) Patent No.: US 11,269,927 B2
(45) Date of Patent: Mar. 8, 2022

(54) TRANSACTIONAL REPLICATOR

(71) Applicant: Microsoft Technology Licensing, LLC, Redmond, WA (US)

(72) Inventors: Gopal Krishna R. Kakivaya, Sammamish, WA (US); Anurag Gupta, Redmond, WA (US); Sumukh Shivaprakash, Redmond, WA (US); Mihail G. Tarta, Sammamish, WA (US); Mert Coskun, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 472 days.

(21) Appl. No.: 16/403,904

(22) Filed: May 6, 2019

(65) Prior Publication Data

US 2019/0324973 A1 Oct. 24, 2019

Related U.S. Application Data

(63) Continuation of application No. 14/920,351, filed on Oct. 22, 2015, now Pat. No. 10,282,364.

(60) Provisional application No. 62/154,087, filed on Apr. 28, 2015.

(51) Int. Cl.
*G06F 16/00* (2019.01)
*G06F 16/27* (2019.01)

(52) U.S. Cl.
CPC .................. *G06F 16/275* (2019.01)

(58) Field of Classification Search
CPC ...................................................... G06F 16/27
See application file for complete search history.

(56) References Cited

PUBLICATIONS

Ahmad et al., "Failure Semantic of Neighbour Replication Grid Transaction Model," 2010 10th IEEE International Conference on Computer and Information Technology (CIT 2010), pp. 668-673. (Year: 2010).*
Traiger et al., "Transactions and Consistency in Distributed Database Systems," IBM Research Laboratory, ACM Transactions on Database Systems, vol. 7, No. 3, Sep. 1982, pp. 323-342. (Year: 1982).*

* cited by examiner

*Primary Examiner* — Cheryl Lewis
(74) *Attorney, Agent, or Firm* — Ray Quinney & Nebeker P.C.; James Bullough

(57) ABSTRACT

A transactional replicator applying group commit and barrier concepts is disclosed. Group commit means that the transactional replicator commits multiple transactions in a group and is not restricted to committing single transactions one-at-a-time and is not limited to operating on a single state provider. Barrier means that the transactional replicator does not move forward to commit additional transactions until the previous group of transactions are completed. All state providers must apply their transactions and update state before additional transactions will be committed. A quorum acknowledgement "unlocks" any locks that were acquired to update the state within a state provider. However, as long as there are no lock conflicts, additional transactions can continue to create new group commits as necessary.

20 Claims, 7 Drawing Sheets

TRANSACTIONAL REPLICATOR

CROSS-REFERENCE TO RELATED APPLICATIONS

This application is a continuation of U.S. patent application Ser. No. 14/920,351 (the '351 Application), which is titled, "Transactional Replicator" and was filed on Oct. 22, 2015. The '351 Application claims the benefit of U.S. Provisional Patent Application No. 62/154,087, which is titled "Transactional Replicator" and was filed on Apr. 28, 2015. Each of the aforementioned applications is expressly incorporated herein by reference in its entirety.

BACKGROUND

In the context of databases, a series of logical operations where all the operations must happen or none of the operations must happen is called a transaction. Transactions provide a way to define and freeze relevant state in the data structures of a database. The effects of an update are captured by committing a transaction. When the update is initiated by a protocol request, the transaction is committed before sending the appropriate protocol response. The transaction has "ACID" properties (Atomicity, Consistency, Isolation, Durability), which guarantee that database transactions are processed reliably. The semantics of individual operations (e.g., read, write) govern the interactions between users and the database. Traditionally, transactional semantics have guaranteed ACID properties for only a single database.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are directed to a highly concurrent, write-ahead-logging (WAL) data replicator with first class support for transactions in order to persist and provide high availability of any state that can be represented as a series of operations performed as part of a transaction. The transactional replicator guarantees these atomicity and durability for any transaction.

The replicator expects a higher level component to enforce consistency. Such components are referred to herein as "state providers," that users may implement to provide higher level data semantics. Examples of state providers include data structures such as a queue, stack, dictionary, etc. With the help of such state providers and the transactional replicator, an end user may write extremely simple code to perform operations such as, for example, "pop" an item out of a stack state provider and "push" the same item into a queue state provider in a transaction that guarantees atomicity of such state changes.

The transactional replicator introduces the concepts of "group commit" and "barrier." Group commit means that the transactional replicator commits multiple transactions in a group and is not restricted to committing single transactions one-at-a-time and is not limited to operating on a single state provider. Barrier means that the transactional replicator does not move forward to commit additional transactions until operations in the previous group of transactions have applied their state changes. All state providers must apply their transactions and update state before additional transactions will be committed. A quorum acknowledgement "unlocks" any locks that were acquired to update the state within a state provider. However, as long as there are no lock conflicts, additional transactions can continue to create new group commits as necessary.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
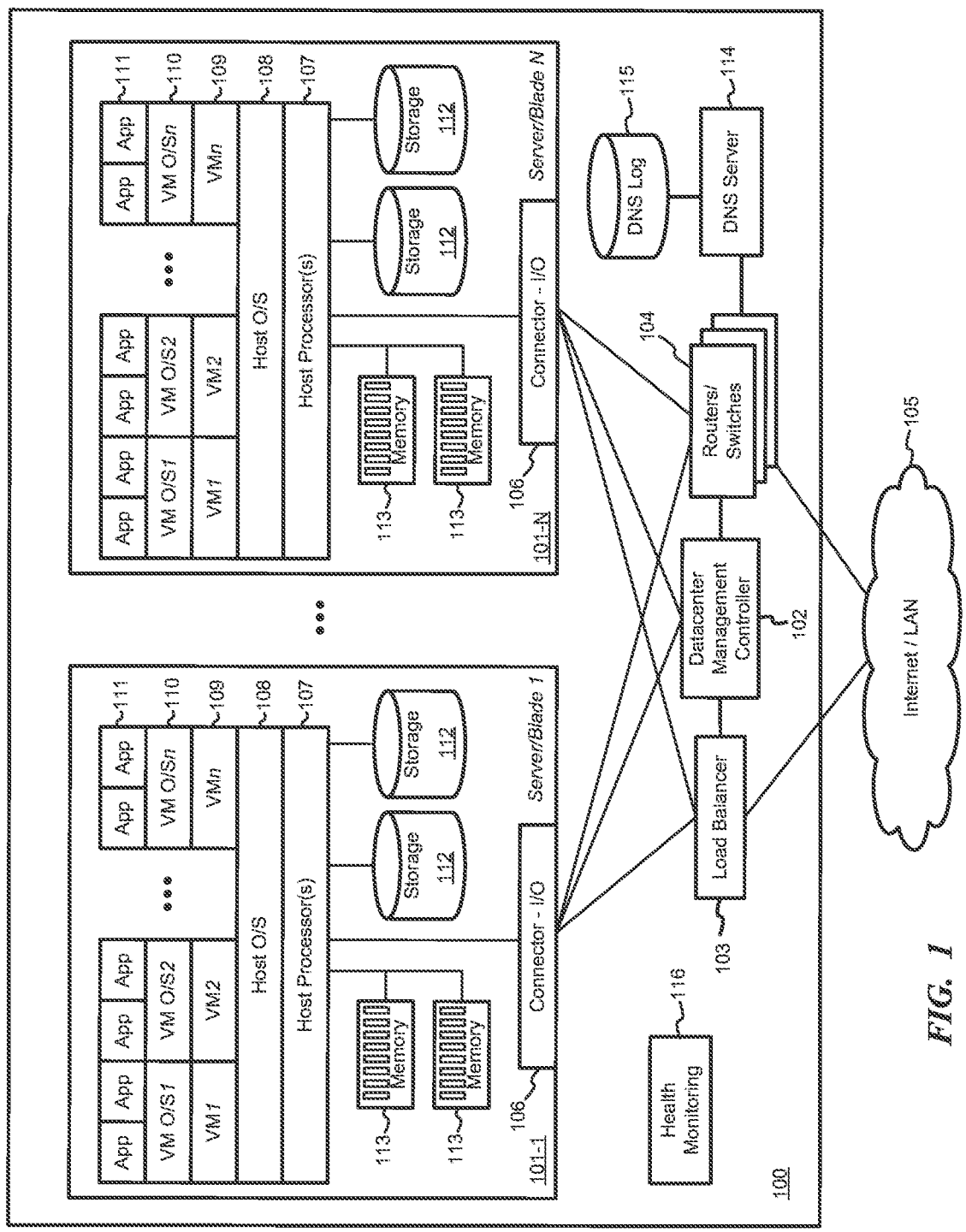
FIG. 1 is a high level block diagram of an example datacenter that provides cloud computing services or distributed computing services.

A transactional replicator system as disclosed herein is agnostic to the semantics of the data being replicated. The data may presume the semantics of a State Provider, such as a "dictionary," for example, wherein each "key" can be modified by only a single user at a time. Once the effects of changes to a "value" are replicated and persisted, the same "key" can be modified again. In another example, the data may presume the semantics of a "stack," where the stack is either "popped" or an item is "pushed" as part of a transaction. In either of these examples, the transactional replicator provides a mechanism for the data structure to perform operations that alter the state within the boundaries of a transaction. Any such state changes can be backed up without downtime. The data structure is referred to herein as State Provider and may take any form, such as, for example, a queue, list, table, stack, dictionary, etc.

Transactional Replicator Barrier Processing:

The State Providers are responsible for exposing the effects of a transaction when the transactional replicator deems it safe. This occurs when the data gets persisted locally and has been replicated to a quorum of other replicas. This ensures that the data is available to later reproduce the state changes made by the transaction in the event of a failure or to restore from backup.

The transactional replicator disclosed herein introduces the concept of a "Barrier," which occurs when a group of transactions are persisted on disk in a batch and their effects are applied by the State Provider. This is similar to what is commonly referred to as a "Group Commit" in traditional database systems; however, the transactional replicator described below extends the notion of a "Group Commit" to a "Barrier," which enables parallel dispatch of transactions across multiple state providers to achieve better throughput without being aware of the higher-level data structure of the state provider that is built on top of the transactional replicator. This allows the transactional replicator to be a general purpose component that a variety of state providers may utilize.

Backup/Restore of Transactional Replicator State:

Large scale distributed systems commonly use replication to make the state highly available. Though live replication provides superior failover characteristics, it is limited in the type of failures that it can protect against state loss. A system that relies only on replication to keep its state highly available can fail in a number of ways, such as:

A natural disaster may wipe out all datacenters that are hosting the machines (or a quorum of the machines hosting a partition including the primary) in the cluster.

An administrator/developer issues a command by mistake that deletes the state of the application. Since all operations are replicated, the entire replica set's state will be affected by this operation.

Software bugs that cause data corruption.

To mitigate such disasters, systems require the ability to backup and restore a consistent snapshot of their state and to archive the state in a different fault domain. The systems need to make backups frequently in a live cluster even when they are under heavy load. To solve this problem, the transactional replicator provides consistent backups with minimal resource usage and no downtime. The transactional replicator also detects when data is suspected to be lost and then coordinates with the system to restore data and state from the last good backup. In addition to mitigating disasters, such backup and restore capability enables offline verification and testing.

A transactional replicator according to one embodiment provides:

1) The concept of "barrier" processing for transactions to enable high throughput of transactions, while remaining agnostic to the internal implementation details of the higher-level data structure (i.e., state provider) that is using the transactional replicator;
2) No-downtime, partition-wide, consistent backup of state;
3) Minimal resource usage to perform such backups (e.g., utilizing the transaction log and checkpoint persistence model of the transactional replicator); and
4) The ability to stitch together backups taken by different replicas during a restore.

FIG. 1 is a high level block diagram of an example datacenter 100 that provides cloud computing services or distributed computing services, such as transactional databases or other state provider applications. A plurality of servers 101 are managed by datacenter management controller 102. Load balancer 103 distributes requests and workloads over servers 101 to avoid a situation wherein a single server may become overwhelmed. Load balancer 103 maximizes available capacity and performance of the resources in datacenter 100. Routers/switches 104 support data traffic between servers 101 and between datacenter 100 and external resources and users (not shown) via an external network 105, which may be, for example, a local area network (LAN) or the Internet.

Servers 101 may be standalone computing devices and/or they may be configured as individual blades in a rack of one or more server devices. Servers 101 have an input/output (I/O) connector 106 that manages communication with other database entities. One or more host processors 107 on each server 101 run a host operating system (O/S) 108 that supports multiple virtual machines (VM) 109. Each VM 109 may run its own O/S so that each VM O/S 110 on a server is different, or the same, or a mix of both. The VM O/S's 110 may be, for example, different versions of the same O/S (e.g., different VMs running different current and legacy versions of the Windows® operating system). In addition, or alternatively, the VM O/S's 110 may be provided by different manufacturers (e.g., some VMs running the Windows® operating system, while others VMs are running the Linux® operating system). Each VM 109 may also run one or more applications (App) 111, such as a transactional database or state provider application. Each server 101 also includes storage 112 (e.g., hard disk drives (HDD)) and memory 113 (e.g., RAM) that can be accessed and used by the host processors 107 and VMs 109 for storing software code, data, etc.

Datacenter 100 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 100 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 109 on server 101-1 to run their applications 111. When demand for an application 111 increases, the datacenter 100 may activate additional VMs 109 on the same server 101-1 and/or on a new server 101-N as needed. These additional VMs 109 can be deactivated if demand for the application later drops.

Datacenter 100 may offer guaranteed availability, disaster recovery, and back-up services. For example, the datacenter may designate one VM 109 on server 101-1 as the primary location for the tenant's application and may activate a second VM 109 on the same or different server as a standby or back-up in case the first VM or server 101-1 fails. Database manager 102 automatically shifts incoming user requests from the primary VM to the back-up VM without requiring tenant intervention. Although datacenter 100 is illustrated as a single location, it will be understood that servers 101 may be distributed to multiple locations across the globe to provide additional redundancy and disaster recovery capabilities. Additionally, datacenter 100 may be an on-premises, private system that provides services to a single enterprise user or may be a publically accessible, distributed system that provides services to multiple, unrelated customers and tenants or may be a combination of both.

Domain Name System (DNS) server 114 resolves domain and host names into IP addresses for all roles, applications, and services in datacenter 100. DNS log 115 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 116 monitors the health of the physical systems, software, and environment in datacenter 100. Health monitoring 116 provides feedback to datacenter managers when problems are detected with servers, blades, processors, or applications in datacenter 100 or when network bandwidth or communications issues arise.

Figure 2:
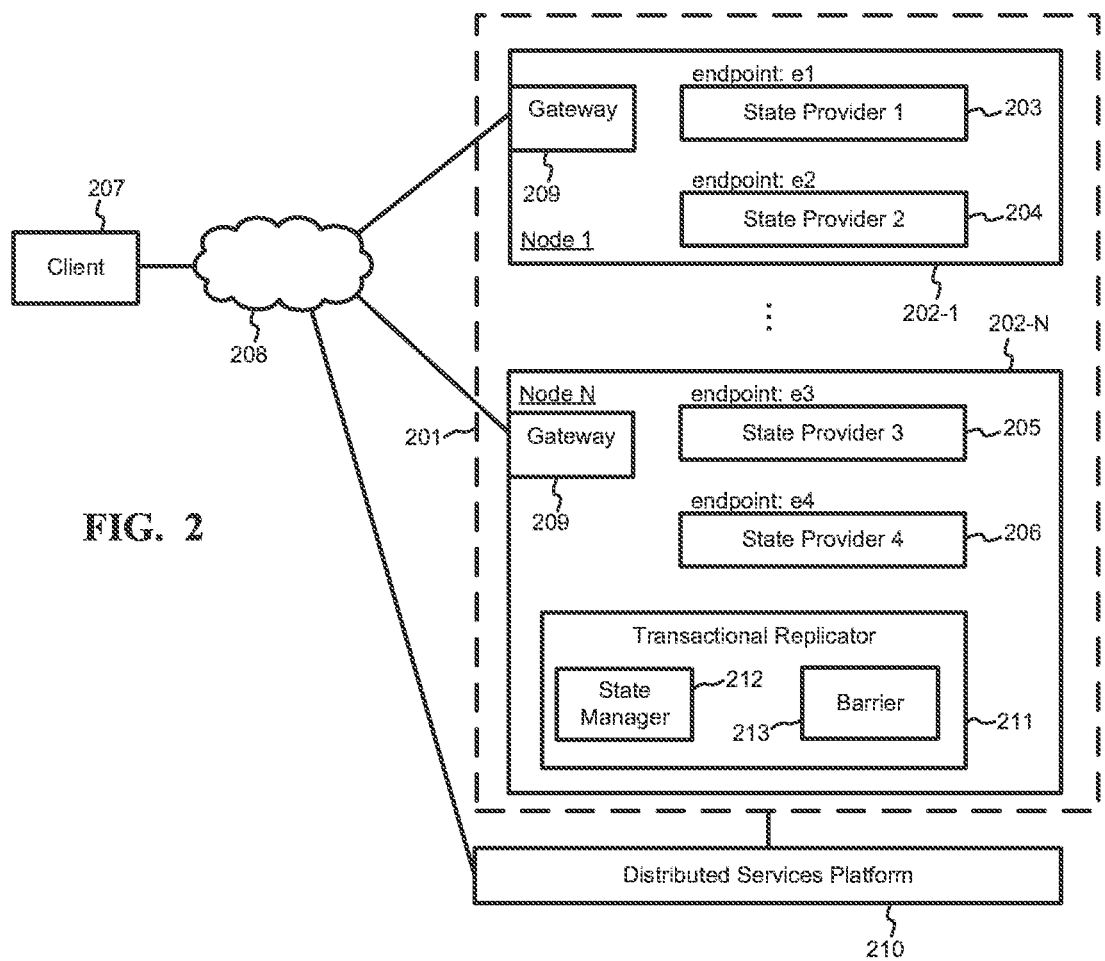
FIG. 2 is a block diagram illustrating a simplified cluster comprising N nodes.

FIG. 2 is a block diagram illustrating a simplified cluster 201 comprising N nodes 202, which may represent different servers, processors, or VMs. For example, referring to the example illustrated in FIG. 1, servers 101, processors 107, or VMs 109 may correspond to different nodes 202. Such nodes 202 may be distributed across a number of separate geographical locations. Cluster 201 controls the services running on the nodes 202, such as state providers 203-206, and balances the service load among the nodes. Cluster 201 also provides backup and redundancy for the state providers. In a datacenter environment, there may be tens of thousands of service instances deployed on a cluster. State providers 203-206 may include, for example, transactional databases. Both primary and secondary replicas of the state providers 203-206 are supported by cluster 201 for redundancy and backup.

Users access the services deployed on cluster 201 via one or more clients 207, which may be, for example, applications running on desktop, laptop, or tablet computers or on mobile devices. Client 207 communicates with cluster 201 through network 208, which may be any public or private data network, such as the Internet, an intranet, or a LAN. Client 207 accesses services running on the cluster though gateways 209. In order to access services that use state providers 203-206, the client 207 connects to any gateway 209 to determine the endpoint assigned to a primary replica of a service running on the cluster 201. The client 207 then communicates with that replica of the service.

Cluster 201 may be supported by a distributed services platform 210 that manages the available infrastructure resources and the requirements of the services and applications running on the cluster. Distributed services platform 210 provides comprehensive runtime and lifecycle management capabilities and enables automatic updating and self-healing to ensure delivery of highly available and durable services via cluster 201. Distributed services platform 210 supports microservices in which complex applications are composed of small, independently versioned services running at very high density on a shared pool of machines, such as cluster 201. In one example, distributed services platform 210 may be the Azure Service Fabric provided by Microsoft Corporation. Distributed services platform 210 manages the service endpoints in cluster 201. A distributed services platform 210, such as Microsoft Corporation's Fabric, is a framework for hosting services. The distributed services platform 210 handles availability, service discovery, partitioning, zero-downtime upgrades, monitoring, load balancing, failure detection, and data replication.

If a node 202 fails while running a primary replica of a service, the cluster 201 will designate a secondary replica on an active node as the new primary replica. Advantageously, cluster 201 may use transactional replicator 211 to ensure that transactions are replicated across all instances of a state provider 203-206. This ensures that a quorum of primary and secondary replicas for the service have the same state changes made by transactions. Transactional replicator 211 may be, for example, a service running on a node within the cluster 201.

Advantageously, the transactional replicator 211 guarantees high parallelism across multiple state providers using barrier processing as described herein. Transactional replicator 211 comprises a state manager 212 component that is aware of the multiple state providers 203-206. State manager 212 manages the state providers' lifecycle, creates and replicates new state providers, maps data to state providers, and multiplexes/demultiplexes data to the state providers. Transactional replicator 211 also comprises a barrier component 213 that maintains semantics among the multiple state providers and at any point in time defines the order of operations that the state providers perform.

Barrier 213 keeps track of the order of operations on a state provider and ensures the same order of operations on every other replica of the state provider and ensures that state changes are available to all of the state providers. Barrier log record processing allows the transactional replicator 211 to define the order of operation across multiple state providers. The replicator 211 ensures that the order is preserved even when a node 202 fails or instructions are being replicated on a second machine.

For example, if a user wants to remove an item from a queue state provider and add that item to a stack state provider, this operation crosses two state providers, but the transactional replicator provides the transactional semantics to allow the user to perform this in a single transaction. Transactional replicator 211 provides transaction guarantees of atomicity and durability. State providers 203-206 enable guarantees of consistency and isolation.

Figure 3:
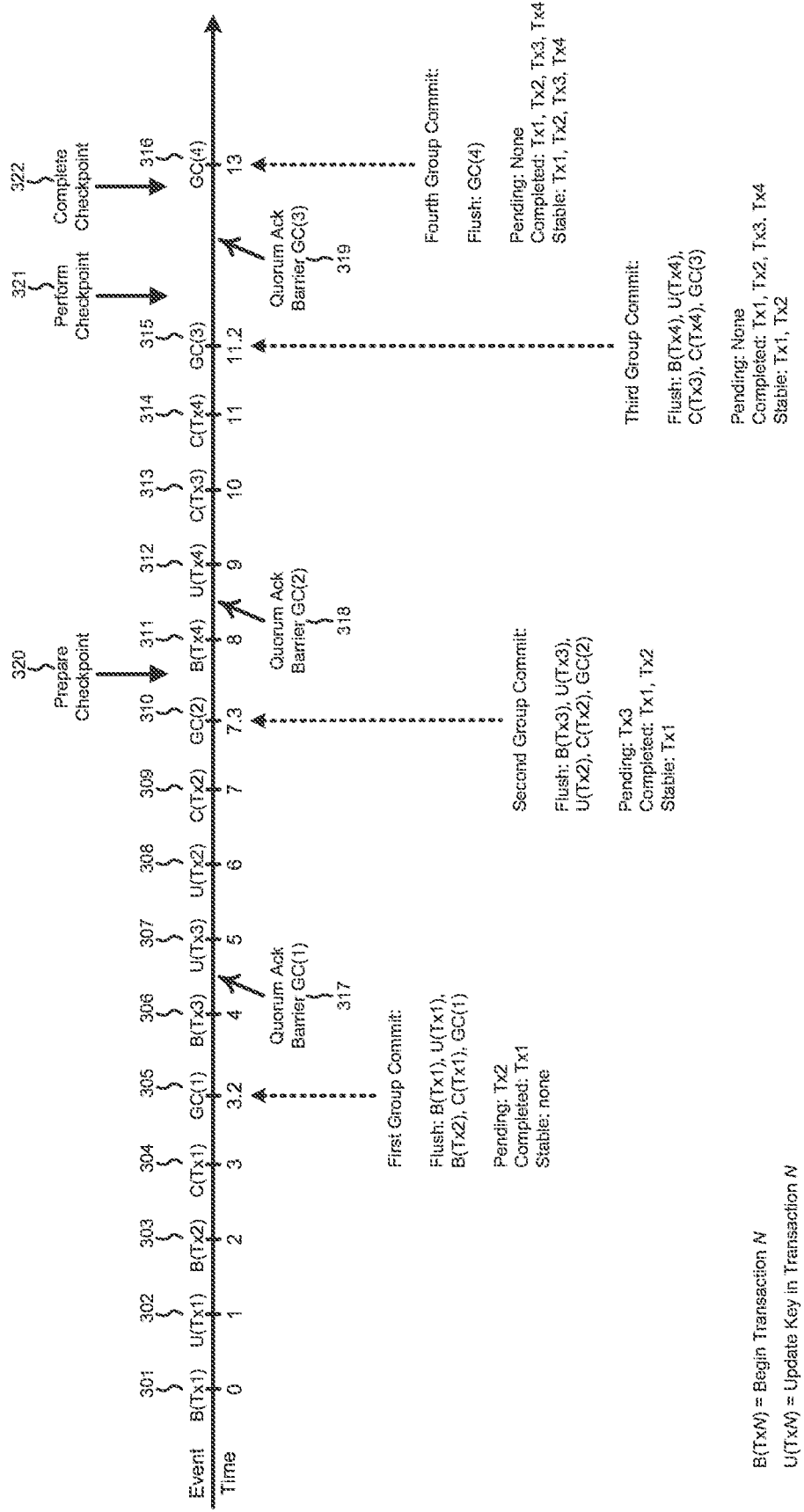
FIG. 3 is timeline illustrating example barrier processing events in a transactional replicator.

FIG. 3 is timeline illustrating example barrier processing events in a transactional replicator. Events associated with four transactions are illustrated in FIG. 3. The events include, for example, beginning a transaction "B(TxN)", updating the transaction "U(TxN)", and committing the transaction "C(TxN)". These transactions may be associated with any type and number of state providers. To simplify the illustration and related discussion, these events are shown as occurring at regular intervals; however, it will be understood that the events may occur at any interval or at the same or overlapping times in other embodiments.

A user begins a first transaction 301 and updates the first transaction 302 and then a second transaction begins 303 before the user commits the first transaction 304. At a first Group Commit "GC(1)" 305, the transactional replicator converts the events to a barrier record and commits the events as a group rather than singly as done in prior systems. The transactional replicator flushes the events 301-305 to disk and calls an "Apply" API to apply all received operations to the primary and secondary replicas of the state providers. At the Group Commit barrier, transaction states are applied by the state providers. Changes due to the transactions are made visible to the user when the state has been applied to the state provider. The transaction states at the Group Commit barrier can be categorized as "pending" if the transaction has not yet been committed or aborted, "completed" if the transaction has been committed or aborted, or "stable" if the transaction has been completed and quorum acknowledged.

At the Group Commit barrier 305, the second transaction Tx2 is pending since there has been no commit for that transaction. The first transaction Tx1 has been completed since commit 304 has been received. There are no stable transactions yet because a quorum of replicas have not yet acknowledged the Group Commit.

The cluster receives new operations and incoming events following Group Commit barrier 305. For example, a third transaction Tx3 begins 306 and is updated 307 and the second transaction is updated 308 and committed 309. The transactional replicator applies operations to state providers in groups. Until the all of the state changes associated with the first barrier record at Group Commit 305 are applied, the transactional replicator does not apply any of the new operations 306-309. This is indicated by a Quorum Ack (acknowledgement) 317 for the first Group Commit barrier, which tells the transactional replicator receives that the operations in Group Commit 305 have been applied. After the Quorum Ack 317 is received, then a new Group Commit barrier may be applied. After receiving commit 309 for the second transaction, the transactional replicator initiates a second Group Commit 310. At this time, the transactional replicator applies all of the operations (306-309) received after the first barrier 305 to the user's state providers. The transactional replicator continues to receive new operations (e.g., 311-314) while applying the second Group Commit 310. These operations are not applied until at least a Quorum Ack 318 for barrier 310 and a new commit transaction operation are received.

At the second Group Commit barrier, GC(2), 310, the third transaction Tx3 is pending since there has been no commit for that transaction. The first and second transactions Tx1 and Tx2 have been completed since commits 304 and 309 have been received. Additionally, the first transaction Tx1 is now stable because Quorum Ack 317 has been received.

Following Group Commit barrier 310, new operations are received while awaiting Quorum Ack 318. A fourth transaction Tx4 begins 313, is updated 307, and is committed 315 and the third transaction is committed 313. When the transactional replicator receives Quorum Ack 318 for the second Group Commit barrier, then it knows that the operations in the second Group Commit 310 have been applied and a new Group Commit barrier may be created.

Although only a single commit transaction is applied in FIG. 3 for each of barriers 305 and 310, this is only for purposes of simplifying the illustrated example. It will be understood that multiple commits may be applied to the state providers in a single Group Commit. For example, if ten commits have been received within a Group Commit boundary, then the transactional replicator will apply all ten transactions to the state providers in parallel. The transactional replicator will not move forward to apply additional later-received transactions until all of the states have been applied for the current Group Commit barrier.

The third Group Commit barrier 315 illustrates committing multiple transactions (Tx3 and Tx4) in a single Group Commit. The transactional replicator flushes the events 311-314 to disk and applies all received operations to the primary and secondary replicas of the state providers. Following the third Group Commit barrier GC(3) 315, there are no transactions pending since no new begin transaction operations were received. All four transactions Tx1, Tx2, Tx3, and Tx4 have been completed since commits 304, 309, 313, and 314 have been received. Additionally, the first and second transactions Tx1 and Tx2 are stable because Quorum Ack 317 and 318 have been received.

A Quorum Ack 319 is received for following third Group Commit barrier GC(3) 315. If no other new operations are received, the transactional replicator may create a fourth Group Commit barrier 316. The transactional replicator flushes the fourth Group Commit GC(4) 316 to disk. The status of the four transactions Tx1, Tx2, Tx3, and Tx4 remain completed and now all of the transactions are stable because quorum acks 317, 318 and 319 have been received.

Advantageously, the use of the transactional replicator to create Group Commit barrier supports multiple state providers and provides atomicity and durability. Transactions and operations that occur across Group Commit barriers never collide because the transactional replicator does not move forward to apply new transactions until all commits within a current Group Commit boundary are applied. The transactional replicator applies all of the transactions within a Group Commit boundary in the same order to all replicas of the state providers so that state changes are the same for each of them. This provides atomicity for multiple state providers. The barrier logging provide durability for the state providers.

Unlock.

Figure 4:
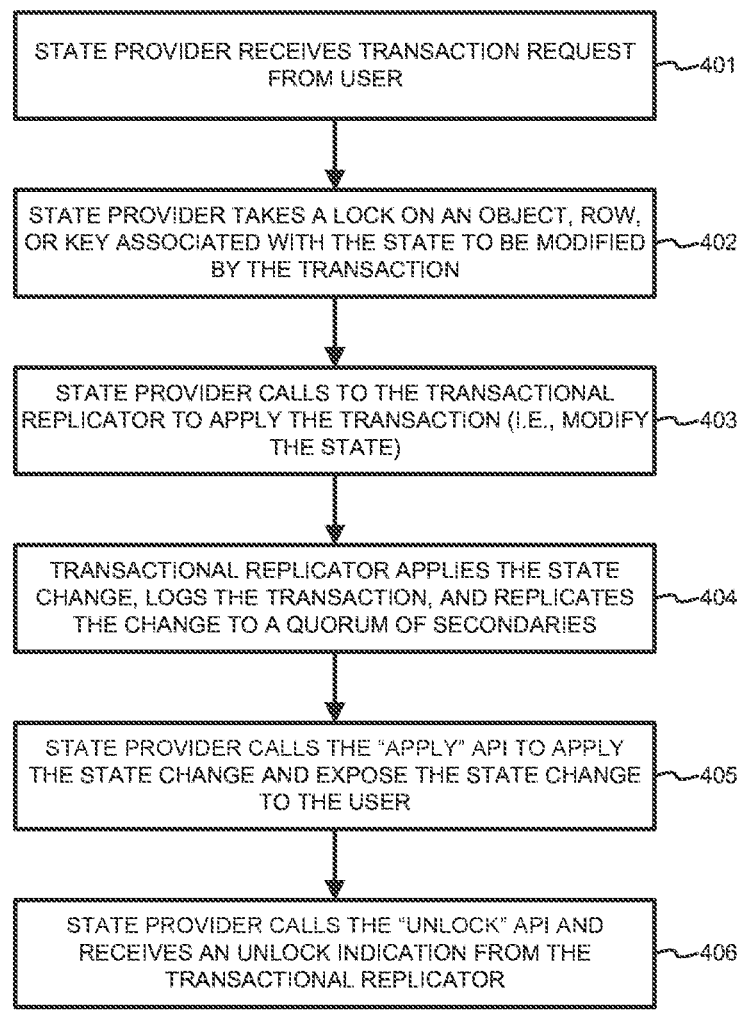
FIG. 4 illustrates an example workflow for a typical state provider, such as a dictionary or storage state provider.

The transactional replicator enables state providers to manage isolation boundaries by providing an "unlock" API. The workflow for a typical state provider, such as a dictionary or storage state provider, is illustrated in FIG. 4. In step 401, the user receives a transaction request from a user. In step 402, the state provider takes a lock on the object, row, or key associated with the state that will be modified by the transaction. For example, if a user asked to update a field in a dictionary, the state provider would first take a lock on that row. In step 403, the state provider then calls to the replicator to apply the transaction, such as making the update to the dictionary field. In step 404, the transactional replicator applies the state change and logs the transaction. The transactional replicator also replicates the state change to a quorum of secondary state providers to keep the state highly available in the event that the primary fails.

In step 405, after the state change has been logged, the state provider calls an "apply" API to apply the state change and to expose the state change to the user. The state provider does not unlock the object, row, or key associated with the modified state until it knows that a quorum of secondaries have also received this operation. In step 406, to ensure that the state is not modified too soon, the state provider calls the "unlock" API. When the state provider receives "unlock" from the replicator, this indicates that a quorum of secondaries have applied the state change, so it is safe to make further changes to the object, row, or key. This ensures that the state change is durable and reliable (i.e., if the primary replica fails, one of the quorum of secondaries can take over) and enables the state provider to give isolation.

A Quorum Ack (e.g., 317, 318, 319 in FIG. 3) is received asynchronously after each Group Commit and indicates that a quorum of secondaries have applied the state changes within that Group Commit. This indicates that the transaction is stable meaning that the transaction state has been completed (or aborted) that it has been replicated to a quorum of secondaries.

Checkpointing.

Many applications and other resources store data in registry keys outside of the cluster database. Checkpointing is the process of associating a resource with one or more registry keys so that when the resource is moved to a new node (e.g., during failover), the required keys are propagated to the local registry on the new node. Advantageously, state providers perform checkpointing in three phases (Prepare, Perform, and Complete) to support the transactional replicator.

The transactions and Group Commits are logged into a single transaction log within the replicator. At some point the log will become too large or the replicator will run out of log space. At that point the replicator will need to checkpoint, which will allow the replicator to truncate the transaction log and reuse the space to log future transactions without losing any state changes. This is accomplished by the replicator instructing the state provider to checkpoint all their state. The state providers implement three APIs for checkpointing: Prepare checkpoint, Perform checkpoint, and Complete checkpoint.

The Prepare checkpoint API allows the replicator to tell the state provider to be ready to implement a checkpoint. The state providers may use any checkpoint process appropriate for the type of data and states supported by a particular state provider. The Prepare checkpoint API is called on the state provider at the Group Commit boundaries after finishing the processing of the Group Commit.

For example, referring to FIG. 3, after GC(2) 310 processing, the replicator may decide that it needs to checkpoint the state. Accordingly, after the second Group Commit GC(2) processing is complete (i.e., after the state provider has applied transaction two Tx2), the replicator calls the Prepare checkpoint API 320 on the state providers. At this point, the replicator is telling the state provider that any transactions that have been applied on the state provider must be included in the checkpointed state. In the example of FIG. 3, transaction three Tx3 has not been applied yet. Therefore, transaction three Tx3 is not included in the transaction because the state provider has not received an apply API call for that transaction. However, the state provider must guarantee to checkpoint state for completed transactions one and two Tx1, Tx2, which have been applied.

The Perform checkpoint API 321 instructs the state providers to execute the checkpoint. This may involve, for example, writing state to disk or uploading state to a network database or any other checkpoint procedure implemented by the state provider to persist its state somewhere. The Perform API is called after the Prepare API. The replicator then writes a log report indicating that the checkpoint has finished this second phase. There is no specific timing requirements for the replicator to call the Perform API following the Prepare API. The state provider will link the preform API call to the previous Prepare API call and will perform the checkpoint only on whatever state that was included following the Prepare API. The Preform API call 321 will not be made until a Quorum Ack is received for the Group Commit that is in progress when the checkpointing begins. This ensures that a quorum of state providers have applied the states and no false progress is included in the checkpointing.

The Perform API call 321 does not have to happen within the current Group Commit. For example, in FIG. 3, the Perform checkpoint API call 321 may come after the third Group Commit GC(3) 315. This Perform API call 321 instructs the state provider to perform checkpointing on any state prepared in response to Prepare API 320 (e.g., state for transactions Tx1, Tx2). There are no Group Commit semantics for the Perform checkpoint call 321, so this call may occur at any time after the Prepare checkpoint call 320.

The Complete checkpoint API call 322 typically occurs shortly after the Perform checkpoint call 321, such as immediately after the replicator logs that the second phase (i.e., Perform) of the checkpointing is complete. In response to the Complete API call 322, the state provider makes the checkpoint data visible to the user. The replicator then logs that the third phase of the checkpoint is complete.

Figure 5:
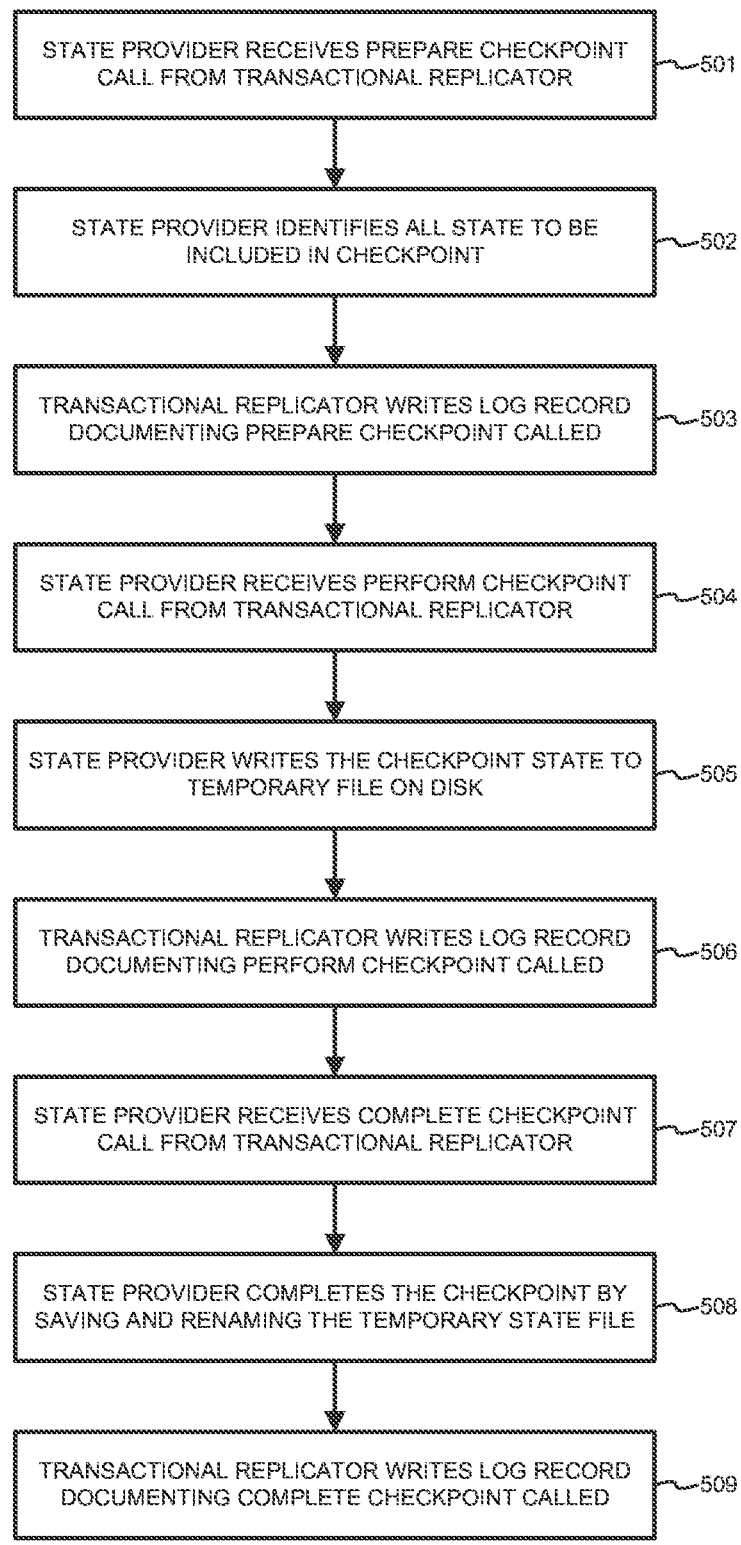
FIG. 5 is a flowchart illustrating checkpointing according to one embodiment.

FIG. 5 is a flowchart illustrating checkpointing according to one embodiment. In step 501, a state provider receives a Prepare checkpoint API call from the transactional replicator. In step 502, the state provider identifies all state to be included in the checkpoint. This includes all transactions committed in the last Group Commit. The replicator write a log entry documenting the Prepare call in step 503.

In step 504, the state provider receives a Perform checkpoint API call from the transactional replicator. In step 505, the state provider performs the appropriate checkpoint for the type of state to be documented. For example, the state provider may write the state to a temporary file on a disk. The replicator write a log entry documenting the Preform call in step 506.

In step 507, the state provider receives a Complete checkpoint API call from the transactional replicator. In step 508, the state provider saves the checkpoint state, such as by renaming the temporary file to a valid checkpoint filing name. Once all three phases are performed, then the checkpoint is finished. Until the Complete checkpoint API call, the state file should not be read. The replicator write a log entry documenting the Prepare call in step 509.

Checkpointing is implemented using these three steps to support the guarantees that the replicator provides to the state providers. Namely, the state providers never checkpoint data that could be lost or false progressed. Until the Quorum Ack is received (e.g., 317-319 in FIG. 3), the data is unreliable. For example, if a primary replica is completing a transaction following a Group Commit, and the node hosting that primary replica fails, then the secondary replicas may not receive the transaction before the primary's node failed. The transaction may be lost if the node fails before the Quorum Ack for that Group Commit. As a result, the customer could lose state for that transaction. If the failed node had checkpointed prior to failure and then come back online later, the log for that failed node would indicate that the transaction had been performed even though the secondaries never have received that transaction. The system then has false progress for that transaction. To prevent this from occurring, Prepare can be called anytime following the Group Commit, but Perform is not called until after the Quorum Ack is received. This ensures that the transactions within the Group Commit boundary are applied to a quorum of replicas before checkpointing is completed by individual state providers. This further guarantees that checkpoints do not include false progress data.

The APIs discussed above are related as follows:

Apply and Prepare Checkpoint are tied to Group Commit. The replicator calls Apply and updates the state of the state providers for all the transactions with the Group Commit boundary. The state providers may start a checkpoint for the transactions within the Group Commit.

Unlock and Perform Checkpoint are is tied to Quorum Ack. The transactions in a particular Group Commit are unlocked on a state provider when the Quorum Ack for that Group Commit is received. When the quorum of replicas have applied the transaction, then the data may be written to disk for the checkpoint.

Complete Checkpoint is not related to the Apply or Unlock calls, but is called very shortly after the Perform Checkpoint.

The log records are used during recovery of a replica. When a state provider is being recovered, these three stages of checkpointing guarantee that the correct state is recovered. When the replica comes back up and reads its log, the replicator can determine whether all of the Prepare, Perform, and Complete calls were received. If all three phases were not completed, then the replicator knows which phases still need to be called to ensure that the recovered replica has the correct state. This three-phase checkpointing advantageously prevents the state provider from recording false progress Backup/Restore.

Even when there is replication across multiple nodes in a datacenter, there is a risk of data loss or state loss due to, for example, a natural disaster, malicious attacks, or other threats. To cover various potential data-loss scenarios, the transactional replicator advantageously includes code for backup and restore. Recovery from the following scenarios are supported by the transactional replicator:

Disaster recovery: the transactional replicator has the ability to move the state of an entire replica in a consistent and non-blocking manner to a safe place. That replica may then be returned to the system for recovery if a disaster occurs.

Accidental deletion: if, for example, a user mistakenly deletes state from a production cluster, the transactional replicator allows the deleted state to be restored.

Software errors/bugs: a software error may cause corruption of state over time. It may be necessary to recover the correct state from prior replicas.

Testing: customers may need to take samples of a production cluster and import those into a test environment to evaluate the effects of new or modified applications on actual state without risking loss of a production cluster.

With respect to the backup scenarios, the goals of the transactional replicator are consistency and efficiency. When a backup is taken and then restored, all consistency and data integrity rules must be satisfied. The process must allow the users to routinely save backups without stalling the system. To provide this consistent and efficient backup capability, the transactional replicator uses the checkpointing described above. At the start of a new checkpoint, the backup needs to go back only to the previous checkpoint and copy the files changed in the interim. Additionally, the backup process copies all of the log records for the checkpoint interval so to preserve a record of the checkpoint progress during that period. The log records may then be used to make replicas consistent as part of a restore.

The transactional replicator packages the current state and the checkpoint log records into a single record. This data can then be used by the customer for restore. The backup is initially saved to the disk of the primary replica in a local folder that contains all of the information necessary to do a restore of the primary replica. Customers can copy the backup records to any location and then access them later as needed for recovery. After the customer has saved the data to another location, the replicator makes a log entry indicating that the backup has been made safe by the customer up to a particular transaction. Going forward, the replicator only needs to back up from that point.

The customer is alerted when a data loss occurs. The customer may then provide the backup record (i.e., full and incremental backups and log records) from a storage location to a cluster node and tell the system to restore the entire state from the backup. The transactional replicator will then restore the state to a replica on that node and then replicate that state out to all other replicas in the cluster.

For efficiency, the system provides incremental backup. Instead of taking a full back up every time (e.g., taking more than a terabyte of data every five minutes), the system only backs up what has changed in the intervening time.

Backups from different replicas may be merged. For example, a primary replica that has been backed up may fail so that a secondary replica becomes a new primary. Instead of having to take a full new backup of the new primary, the backup process knows that the old primary has an existing backup. Accordingly, the backup process only needs to take an incremental backup of the new primary. This saves resources since all of the original state is available from the old primary backup and new state changes can be preserved in incremental backups of the new primary.

Figure 6:
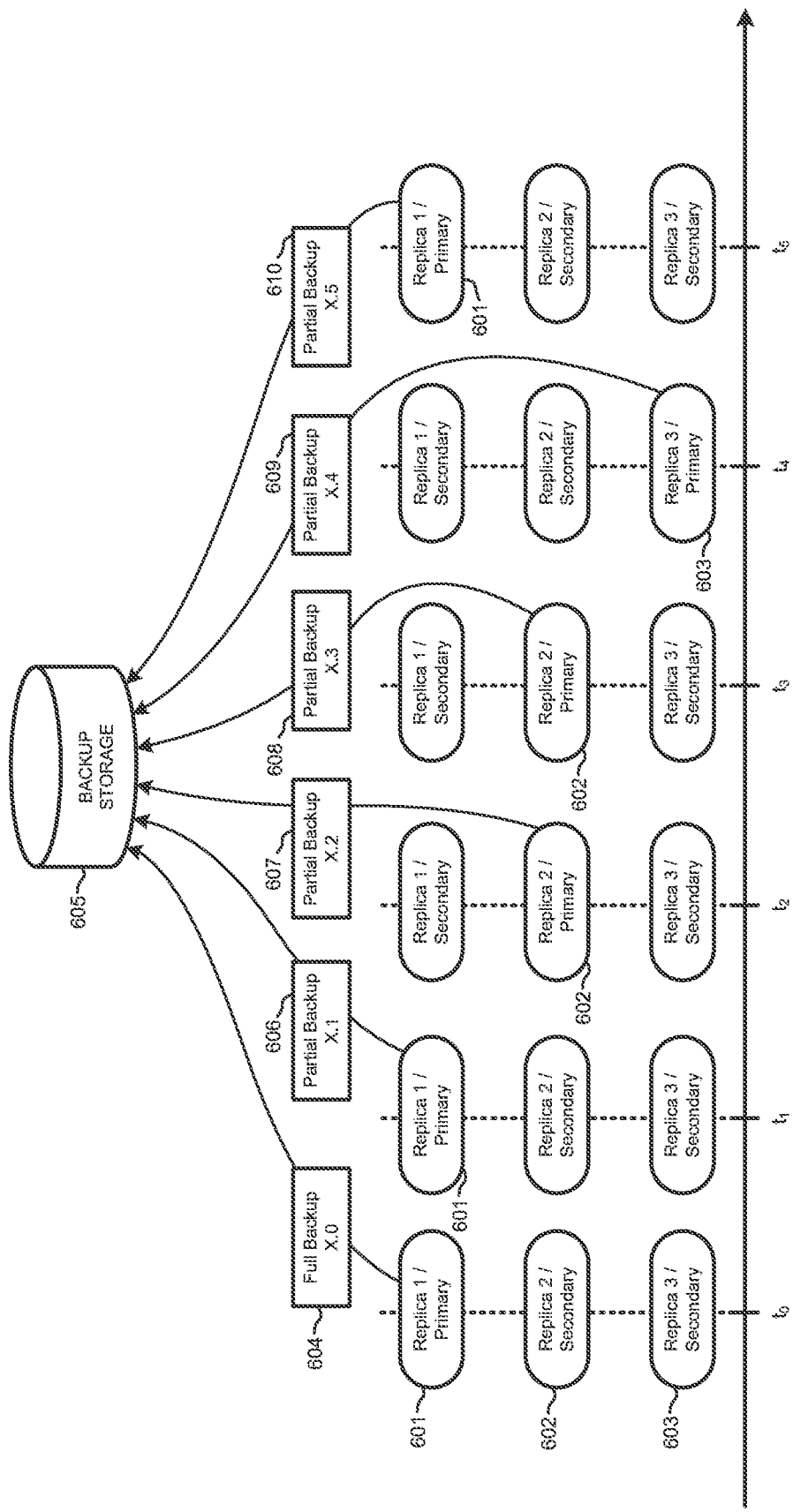
FIG. 6 is a block diagram illustrating how backup data may be collected from multiple replicas.

FIG. 6 is a block diagram illustrating how backup data may be collected from multiple replicas. Three replicas 601-603 are shown in an initial state at time t0. Replica 601 is the primary replica, and replicas 602 and 603 are secondary. At time t0, the replicator instructs primary replica 601 to create a full backup of all current state. Replica 601 provides the backup 604 to the replicator, which may in turn provide the backup 604 to the customer who saves it in offsite backup storage 605. At time t1, replica 601 is still the primary replica and it receives instructions to create an incremental backup of all state change since time t0 when the full backup was created. Replica 601 creates partial backup 606, which is also stored to backup storage 605.

Over time, the roles of each replica may change due to load balancing, node failures, etc. At time t2, replica 602 has become the primary replica, and replica 601 is now secondary. When the replicator determines that a new incremental backup should be created, it instructs the new primary replica 602 to save all state change since time t1 when the last backup was created. Replica 602 creates partial backup 607, which is stored to backup storage 605. At time t3, replica 602, as the primary replica, again creates the next incremental backup 608 for storage in offsite memory 605.

The roles for the replicas change again before time t4 and replica 603 is now the primary. At time t4, the replicator instructs the new primary replica 603 to save all state change since time t3 when the last backup was created. Replica 603 creates partial backup 609, which is stored to backup storage 605. Eventually, at time t5, replica 601 is again the primary and it creates another incremental backup 610.

Full back up 604 includes a full copy of all current state for the state providers at time t0. Incremental backups 606-610 include any checkpoints and log entries created during the period since the last full or incremental backup was saved. This makes the backup process more efficient by limiting the amount of data that needs to be saved at each interval so that smaller backup files can be saved relatively quickly to the offsite storage 605.

When data loss is detected and the state of the replicas must be restored, then the restore process in the replicator will use the full backup file 604 and any subsequent incremental backup files 606-610 to restore the state providers to the state at the time of the last incremental backup. In the example of FIG. 6, even though a full backup had not been taken since time t0, the full state at time t5 can be restored using all of the backup files saved since time t0.

Figure 7:
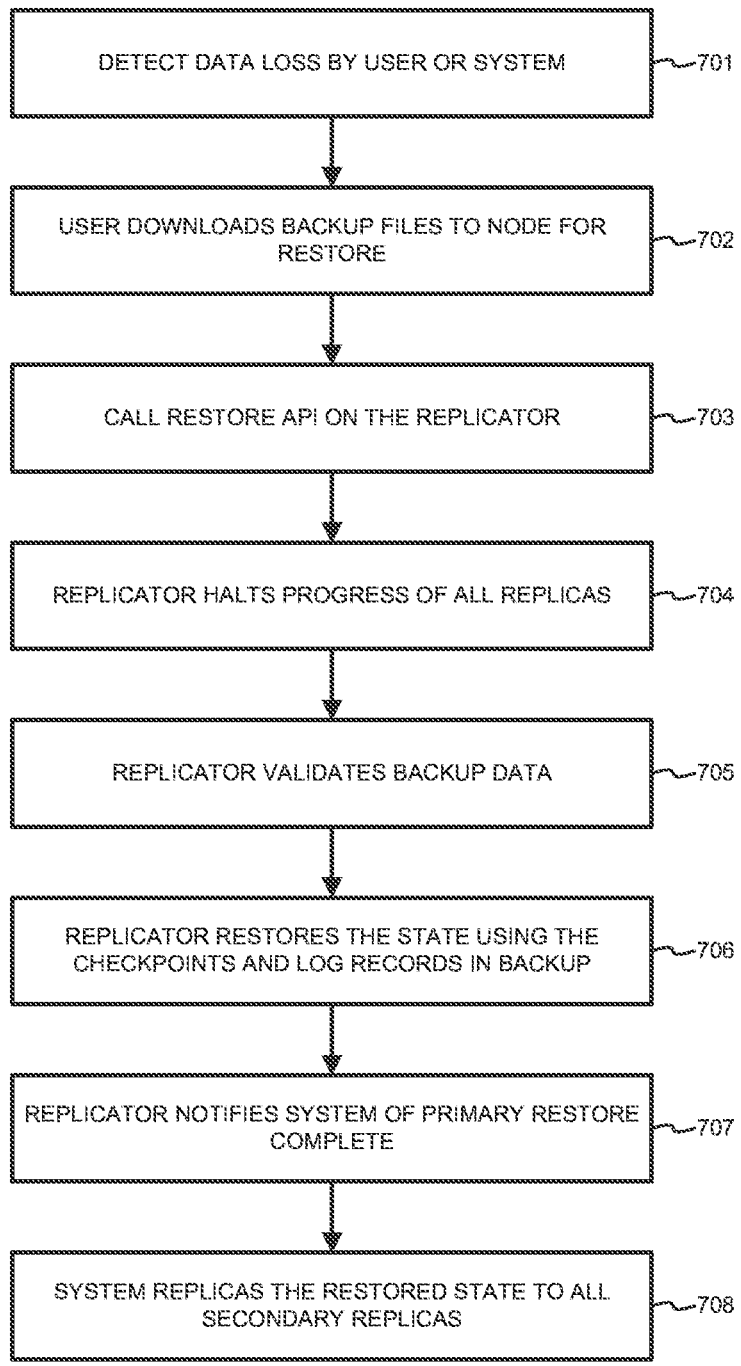
FIG. 7 is a flowchart illustrating the restore process according to one embodiment.

FIG. 7 is a flowchart illustrating the restore process according to one embodiment. In step 701, the process may be initiated when the user detects a data loss or is altered by the system of a data loss. In step 702, the user determines that a restore is needed and downloads backup files to a restore node from a backup storage location. The restore node may be the node hosting the current primary replica or any secondary replica, for example. The backup storage location may be any storage that is separate from the datacenter hosting the replicas and, therefore, not exposed to the same failures or disasters as the datacenter. When the backup folders are copied to the node, the user can call the Restore API on the replicator in step 703.

In step 704, the replicator begins the restore by halting progress in all replicas to avoid any further change of state. In step 705, the replicator validates the state in the backup data. In step 706, if the backup data state is valid, then the replicator restores the state provider state using all the checkpoints and log records in the backup data to make sure that the state of the restored replica matches the state as it was when the last backup was taken. When the replicator has completed restoring the state to a new primary replica, it notifies the system in step 707. The system begins replication of the new primary replica and applies the state of the new primary to any secondary replicas in step 708 and the state in the secondaries is overwritten by the state of the restored replica. When this is complete, then all of the replicas within the cluster will have the state that has been restored from the backup.

Distributed computing systems that comprise a plurality of nodes running a plurality of state provider replicas risk synchronization problems if operations for a particular transaction are not applied to all of the replicas. Advantageously, the transactional replicator described herein allows for multiple transactions in a group to be committed without restriction to committing single transactions one-at-a-time. Advantageously, the transactional replicator is not limited to operating on a single state provider. The transactional replicator does not move forward to commit additional transactions until operations in a previous group of transactions have applied their state changes. This provides improved usability and enhanced reliability in the distributed computing system. Additionally, the transactional replicator advantageously reduces the error rate when applying operations to state providers.

An example system comprises a plurality of nodes each hosting one or more state providers, the state providers configured to provide transactional semantics for interactions with users; and a transactional replicator configured to replicate states from a primary state-provider replica to at least one secondary state-provider replica. The transactional replicator is further configured to: identify when a first transaction has been committed; initiate a first group commit by applying a first group of transaction events to the primary state-provider replicas, wherein the first group of transaction events comprise all transaction events received during a first period; and replicate the first group of transaction events to the secondary state-provider replicas.

The transactional replicator may be further configured to receive a quorum acknowledgement for the first group commit when a quorum of the primary and secondary state-provider replicas have applied the first group of transaction events.

The transactional replicator may be further configured to identify when a second transaction has been committed; if the quorum acknowledgement has been received, execute a second group commit by applying a second group of transaction events to the primary state-provider replicas, wherein the second group of transaction events comprise all transaction events received during a second period that begins at the end of the first period; and replicate the second group of transaction events to the secondary state-provider replicas.

The state providers may be further configured to: receive a transaction event; lock an object to be modified by the transaction; apply an updated state to the object, wherein the updated state is indicated by the transaction event; notify the transactional replicator when the object state has been updated; receive an unlock instruction from the transactional replicator; and unlock the object after receiving the unlock instruction.

The transactional replicator may be further configured to send an unlock command to the state providers after the quorum acknowledgement has been received.

The transactional replicator may be further configured to: after initiating the first group commit, instruct the state providers to prepare to checkpoint their state; after receiving the quorum acknowledge for the first group commit, instructing the state providers to perform checkpointing; and instructing the state providers to complete checkpointing.

The transactional replicator may be further configured to generate log entries when a prepare checkpoint, preform checkpoint, or complete checkpoint instruction is sent to the state providers.

The state providers may be further configured to: receive a prepare checkpoint instruction from the transactional replicator; and identify all state to be documented in a current checkpoint.

The state providers may be further configured to: receive a perform checkpoint instruction from the transactional replicator; and store the state to be documented to a temporary file.

The state providers may be further configured to: receive a complete checkpoint instruction from the transactional replicator; and rename the temporary file to a permanent checkpoint filename after saving the state to be documented.

The transactional replicator may be further configured to: create a complete backup file documenting all state in a current primary state-provider replica; create a series of incremental backup files documenting state changes on the current primary state-provider replica since a prior full or incremental backup, the incremental backup files including checkpoint logs for the primary state-provider replica; and provide the complete and incremental backup files to a user for storage outside the system.

The current primary state-provider replica may change over time among a group of primary and secondary state-provider replicas, and the complete and incremental backup files may be created from more than one individual replica.

The transactional replicator may be further configured to: receive a data-loss recovery instruction from a user; obtain a group of complete and incremental backup files from a user; apply state from the complete backup file to a new primary state-provider replica; apply state changes from the series of incremental backup files to the new primary state-provider replica, wherein the state changes from the incremental backup files are applied in order created, and wherein the checkpoint logs are referenced to ensure no false progress is applied to the new primary state-provider replica.

An example computer-implemented method comprises: receiving, at a state provider running on a node of a distributed computing system, a prepare-checkpoint instruction from a transactional replicator; identifying all current state changes being applied by the state provider; receiving, at the state provider, a perform-checkpoint instruction from the transactional replicator; storing the current state changes to a temporary checkpoint file; receiving, at the state provider, a complete-checkpoint instruction from the transactional replicator; and designating the temporary checkpoint file as a completed checkpoint file.

The computer-implemented method may further comprise: logging, by the transactional replicator, the prepare-checkpoint, perform-checkpoint, and complete-checkpoint instructions as they are provided to the state provider to document checkpoint progress.

An example computing node in a distributed computing system comprises: one or more state providers, the state providers configured to provide transactional semantics for interactions with users; and a transactional replicator configured to replicate states from a primary state-provider replica to at least one secondary state-provider replica, the transactional replicator further configured to: create a complete backup file documenting all state in a current primary state-provider replica; create a series of incremental backup files documenting state changes on the current primary state-provider replica since a prior full or incremental backup, the incremental backup files including checkpoint logs for the primary state-provider replica; and provide the complete and incremental backup files to a user for storage outside the system.

The current primary state-provider replica may change over time among a group of primary and secondary state-provider replicas, and the complete and incremental backup files may be created from more than one individual replica.

The transactional replicator may be further configured to: receive a data-loss recovery instruction from a user; obtain a group of complete and incremental backup files from a user; apply state from the complete backup file to a new primary state-provider replica; apply state changes from the series of incremental backup files to the new primary state-provider replica, wherein the state changes from the incremental backup files are applied in order created, and wherein the checkpoint logs are referenced to ensure no false progress is applied to the new primary state-provider replica.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
memory comprising instructions that are executable by the one or more processors to:
   maintain a barrier log comprising operations associated with a plurality of state providers and an order of the operations;
   initiate a first group commit comprising a first group of operations maintained in the barrier log, the first group of operations comprising all operations received during a first period;
   apply the first group of operations to replicas of the plurality of state providers in the order maintained in the barrier log; and
   receive a quorum acknowledgement for the first group commit, wherein the quorum acknowledgment indicates that a quorum of the replicas has applied the first group of operations and wherein operations received after an end of the first period are not applied to the plurality of service providers until after receiving the quorum acknowledgement for the first group commit.

2. The system of claim 1, wherein the plurality of state providers includes a first state provider of a first type and a second state provider of a second type, and wherein the first type is different from the second type.

3. The system of claim 1, wherein the memory further comprises instructions executable by the one or more processors to:
   initiate, after receiving the quorum acknowledgement for the first group commit, a second group commit comprising a second group of operations maintained in the barrier log, the second group of operations comprising all transaction events received during a second period, wherein the second period begins at the end of the first period; and
   apply the second group of operations to the replicas of the plurality of state providers in the order maintained in the barrier log.

4. The system of claim 1, wherein the memory further comprises instructions executable by the one or more processors to:
   dispatch the first group of operations to the plurality of state providers in parallel.

5. The system of claim 1, wherein the memory further comprises instructions executable by the one or more processors to:
   send, after receiving the quorum acknowledgement for the first group commit, an unlock signal to at least one state provider of the plurality of state providers.

6. The system of claim 1, wherein the memory further comprises instructions executable by the one or more processors to:
   send, after initiating the first group commit, a prepare checkpoint instruction to the plurality of state providers;
   send, after receiving the quorum acknowledgement for the first group commit, a perform checkpoint instruction to the plurality of state providers; and
   send a complete checkpoint instruction to the plurality of state providers.

7. The system of claim 6, wherein the memory further comprises instructions executable by the one or more processors to:
   generate a log entry when the prepare checkpoint instruction, the perform checkpoint instruction, or the complete checkpoint instruction is sent to the plurality of state providers.

8. The system of claim 1, wherein the memory further comprises instructions executable by the one or more processors to:
   create a complete backup file documenting all state changes in a current primary state-provider replica;
   create a series of incremental backup files documenting state changes on the current primary state-provider replica since a prior full or incremental backup, the series of incremental backup files including checkpoint logs for the primary state-provider replica; and
   provide the complete backup file and the series of incremental backup files to a user for storage outside the system.

9. The system of claim 8, wherein the current primary state-provider replica changes over time among a group of primary and secondary state-provider replicas and wherein the complete backup file and the series of incremental backup files are created from more than one individual replica.

10. The system of claim 8, wherein the memory further comprises instructions executable by the one or more processors to:
   receive a data-loss recovery instruction from a user;
   obtain a group of complete and incremental backup files from the user;
   apply state changes from the complete backup file to a new primary state-provider replica; and
   apply state changes from the series of incremental backup files to the new primary state-provider replica, wherein the state changes from the incremental backup files are applied in order created, and wherein the checkpoint logs are referenced to ensure no false progress is applied to the new primary state-provider replica.

11. A computer-implemented method comprising:
   receiving, during a first period, one or more operations associated with a first transaction, wherein the one or more operations associated with the first transaction complete the first transaction;

receiving, during the first period, one or more operations associated with a second transaction, wherein the one or more operations associated with the second transaction do not complete the second transaction;

receiving, during a second period beginning at an end of the first period, an additional operation associated with the second transaction;

applying, after the first transaction is complete, the one or more operations associated with the first transaction and the one or more operations associated with the second transaction to a plurality of state providers;

receiving a quorum acknowledgement, wherein the quorum acknowledgment indicates that a quorum of replicas of the plurality of state providers has applied all operations received during the first period; and waiting to apply the additional operation to the plurality of state providers until after receiving the quorum acknowledgement.

12. The method of claim 11, wherein the plurality of state providers includes a first state provider of a first type and a second state provider of a second type and wherein the first type is different from the second type.

13. The method of claim 11, wherein the first transaction is associated with a first state provider of the plurality of state providers and the second transaction is associated with a second state provider of the plurality of state providers.

14. The method of claim 11, wherein the additional operation associated with the second transaction completes the second transaction and the method further comprises applying, after receiving the quorum acknowledgement, the additional operation to the plurality of state providers.

15. The method of claim 11, further comprising:
dispatching the one or more operations associated with the first transaction and the one or more operations associated with the second transaction to the plurality of state providers in parallel.

16. The method of claim 11, further comprising:
sending, after receiving the quorum acknowledgement, an unlock signal to at least one state provider of the plurality of state providers.

17. A system comprising:
one or more processors; and
memory comprising instructions that are executable by the one or more processors to:
receive a transaction request;
lock an object associated with a state that will change as a result of the transaction request;
request application of the transaction request;
modify the state to a changed state;
receive an unlock signal, wherein the unlock signal indicates that the changed state has been applied to a quorum of replicas of a state provider; and
unlock the object after receiving the unlock signal.

18. The system of claim 17, the memory further comprising instructions executable by the one or more processors to:
expose the changed state to a user.

19. The system of claim 17, wherein the system receives the unlock signal after sending an unlock request.

20. The system of claim 17, the memory further comprising instructions executable by the one or more processors to:
receive, while the object is locked, a second transaction request that will change a second state of the object; and
wait to modify the second state of the object until after receiving the unlock signal.

* * * * *